April 6, 1965    J. C. WASZKIEWICZ, JR    3,177,108
FLORAL GARLAND AND CLIP
Original Filed April 18, 1960
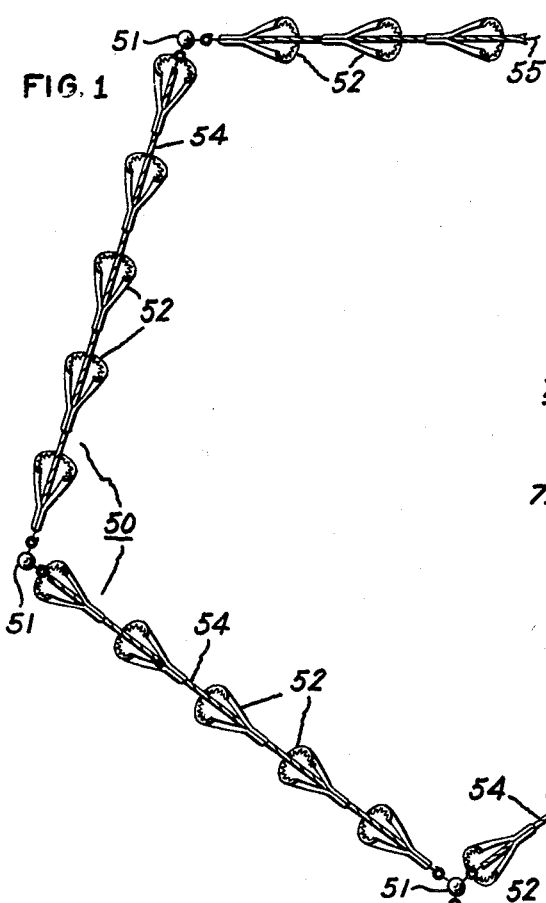
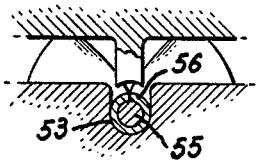
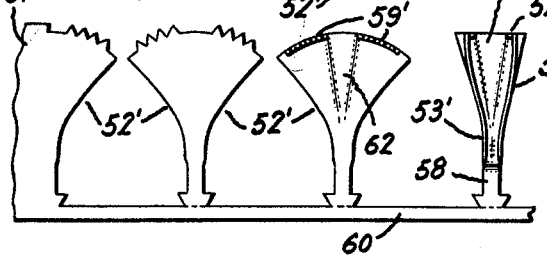
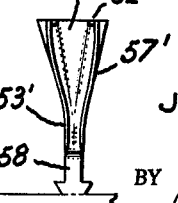
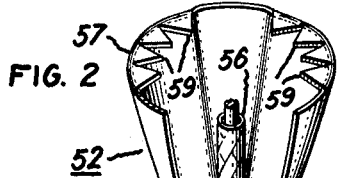
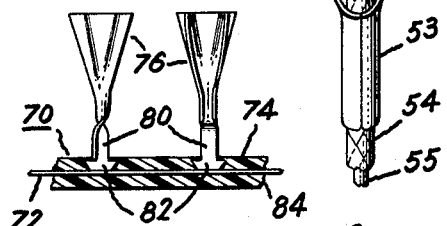
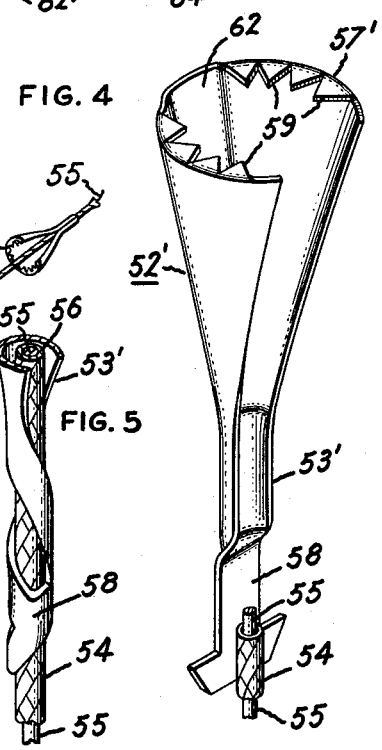
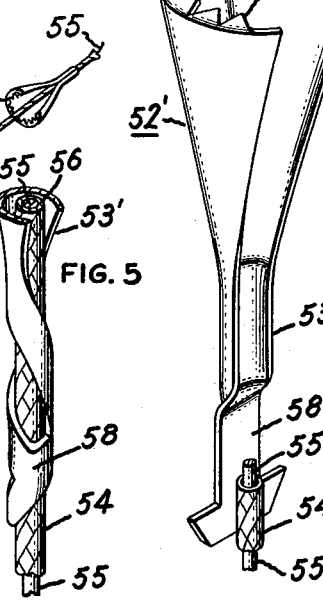
INVENTOR
JOHN C. WASZKIEWICZ JR.,
BY Robert O. Wright
ATTORNEY

United States Patent Office 3,177,108
Patented Apr. 6, 1965

3,177,108
FLORAL GARLAND AND CLIP
John Chester Waszkiewicz, Jr., Middle Settlement Road, New Hartford, N.Y.
Original application Apr. 18, 1960, Ser. No. 23,099. Divided and this application Nov. 13, 1962, Ser. No. 238,321
1 Claim. (Cl. 161—27)

This invenion relates to forms for floral arrangements and more particularly to a deformable clip for fastening flowers in such arrangements, and this application is a division of copending application Serial Number 23,099, filed April 18, 1960, now abandoned.

It is an object of the present invention to provide a flower clip for use in a floral arrangement that may be simply and easily attached thereto and which will simply and securely receive a natural flower therein.

It is a further object of the present invention to provide a flower clip for use in a floral arrangement that may be simply and easily formed about at least a portion of the flower to securely fasten it therein and which may be readily and simply formed about a portion of the floral arrangement frame to secure the assembly thereto.

It is a still further object of the present invention to provide a floral arrangement clip structure that may be utilized to form an infinite variety of bouquets, corsages and the like by relatively unskilled labor in a minimum of time.

Other objects and advantages will become apparent from the following description taken in conjunction with the accompanying drawings, in which:

FIGURE 1 is a plan view partially broken away of a rosary piece employing a clip according to the present invention;

FIGURE 2 is an enlarged detail view of a flower clip of FIGURE 1;

FIGURE 3 is a partial sectional view of the crimping die for forming the clip of FIGURE 2 about the cord of FIGURE 1;

FIGURE 4 is an enlarged perspective view of another flower clip according to the present invention;

FIGURE 5 is a fragmentary detailed view of the attachment of the clip of FIGURE 4 to a cord member;

FIGURE 6 is a plan view of a strip of sheet metal showing the various steps of formation of the clip of FIGURE 4;

FIGURE 7 is a side elevation partially in section of a flower frame strip according to the present invention; and FIGURE 8 is a top plan view of one of the clips of FIGURE 6.

In the embodiment shown in FIGURE 1, a metalized thread braid of a silver or gold color is used for the covering of the wire 55 and the flower receptacles or clips 52 are colored to correspond. The embodiment shown in FIGURE 1 consists of a rosary piece 50 in which the cross and certain of the beads 51 are augmented or replaced by flowers which may be simply and readily placed in the clips 52, as may be seen more clearly in FIGURE 2. In this embodiment the main frame comprises a cord 54 which is formed from a central supporting wire 55 of fairly light gauge covered with a braided metallic thread sleeve 56 to give a decorative and finished appearance to the frame of the rosary arrangement.

The clips 52 are formed from a single piece of aluminum or other satisfactory metal and after being formed in the general shape shown have the lower necks 53 thereof crimped about the cord 54 to securely fix them to the cord so that, when the open upper portion is pinched about a stem or calyx of a flower, the flower will be securely fastened to the rosary garland. The clips have a sort of inverted wigwam or cone shape portion 57 with an opening along one side of approximately one-fourth to one-third of the surface area. The bottom of the clips 52 taper to a channel 53 which in FIGURE 1 is crimped about the cord 54. This forms a secure attachment to the cord and ensures proper fastening of the flowers to the frame. The cord 54 is sufficiently flexible to permit its bending around the wigwam or cone portion 57 of the clip or the clip may be fastened to the flower with the cord therein as desired. As will be seen herein, the channel-shaped neck serves also as a stiffening element.

The upper lip of the cone portion 57 carries on opposite sides thereof four inturned teeth 59 which penetrate the flower calyx, stem, etc., when the receptacles is pinched thereabout. The teeth 59 aid in the firm retention of the flower within the clip receptacle.

The rosary piece 50 comprises a circle of five segments of cord 54 having thereon five clips 52 joined together with a pearlized bead 51. A suitable cross is hung from the loop by a piece of cord 54 having three clips 52 thereon. The florist can then simply complete the piece by inserting roses or other flowers in the clips. The cord 54 is flexible enough so that the piece may be draped as desired about the casket or the like in a pleasing and natural manner yet rigid enough to maintain the desired form.

It has been found that with the clips of FIGURES 1 and 2 closer spacing on the cord can be obtained where it is desired to place a larger number of flowers for special effects. In addition to forming a rosary frame 50, as shown in FIGURE 1, this technique may be used to form an "endless" length of cord with a plurality of clips thereon so that the florist may then merely cut off any desired length he wishes for the particular application.

Referring now to FIGURE 4 there is shown a further modification of the clip of FIGURE 2 in which the individual clips 52' are longer and have a small tail 58 at the bottom thereof for use as will be described herein. The clips of FIGURES 2 and 4 are formed from a blank or strip 61 of sheet metal, as shown in FIGURE 6. They are sequentially formed by first cutting out the right hand half of the flat blank; second, cutting the left hand half; third, bending up the teeth 59' and forming the cone portion 57' into a curved W form as shown in FIGURE 8; and then, finally, forming it up into the circular configuration by closing it in approximately two-hundred-and-seventy degrees and cutting it from the guide srip 60 at the bottom. Teeth 59' are turned up from the blank 61 at an angle of approximately ninety degrees so they will actually pierce the calyx when the formed clip is pinched thereabout. In this form the channel neck portion 53' is interposed between the wigwam portion 57' and tail 58 to stiffen and strengthen the attaching area of the clip. Thus, when the clip is pinched about a flower it forms a rigid connection with the tab 58 at the bottom which tab may then be bent and formed around the floral arrangement frame member or the cord as in FIGURE 5. This forms, in effect, a universal clip that may be simply and easily attached to any type of basic frame.

In manufacturing this clip a soft aluminum, such as 1100–0 and .016 thick has been found satisfactory. This type of aluminum is soft and easy to work and is work-hardenable. The forming process, as described above, is designed to harden the aluminum so that when it comes out in the final form, as shown in FIGURE 4, it has sufficient strength and creep resistance so as to securely hold a flower calyx when pinched thereabout. The inwardly turned teeth which are cut in the forming step as described above also aid to help hold the flower and prevent its being pulled or withdrawn therefrom.

It should be particularly noted that an inverse curve 62 is formed in the blank between the two sides of the wigwam to provide a little extra work hardening in this area. Since the clip bends mostly along this line when pinched about a calyx, this extra work hardening ensures adequate strength in the clip for its intended purpose.

Referring now to FIG. 7, there is shown a still further embodiment of the present invention. In this form of the invention the main frame 70 comprises a single piece of readily deformable wire 72, such as soft iron, of a length of anywhere from six to eight to ten inches or more as desired. Molded thereabout, as illustratively shown in a somewhat triangular cross-section, is a polyethylene or other plastic covering 74. Covering 74 may be tinted to an appropriate green or other color. Positioned closely adjacent to the deformable wire 72 are the bottom tabs 80 of a plurality of clips 76. Clips 76 are spaced at varying intervals along the wire and have at least the lower portion of tabs 80 encased within the molded plastic. The clips 76 are essentially the same as the clips of the embodiment of FIGURE 4 and, in the form illustrated, have the tab 80 extending down into the plastic material and the ears 82 on the tab 80 extending laterally outward therefrom to anchor the clips firmly in the plastic adjacent the wire to form a completed assembly.

It is thus an easy matter for a florist to take a plastic covered wire frame 70 such as shown in FIGURE 7 and place roses or other flowers in the clips and bend the clips and frame somewhat to form a pleasing bouquet. A small handle or other attachment may be made from end 84 of the frame portion, if desired, and a few fill flowers and ribbon may be added to complete the corsage. This provides a very simple, inexpensive and yet highly practical frame for a small bouquet. Since the frame 70 includes the bendable wire 72 it can be formed into any shape desired and will hold its shape. If fewer clips are desired, one or two may be cut off or the frame itself can be shortened by cutting off the undesired portion.

In this same embodiment it should be understood, of course, that the tab 80 could be wrapped around the wire if additional strength is required for particular applications prior to the molding of the covering material. The covering plastic material, of course, covers all attachments and provides a smooth, attractive appearance simulating the stem of a flower or bouquet.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

What is claimed is:

A garland support comprising a thin elongated flexible stem-like cord member, a plurality of clip elements for securing natural flowers on said cord in a predetermined arrangement, each of said clips comprising a hollow manually deformable sheet metal body having a narrow tubular neck portion at one end to encircle and grip the elongated cord member which passes continuously therethrough, said clip body flaring conically outwardly from said neck portion and, prior to engagement with a flower, having the configuration of the major portion of a hollow cone partially open along a sector of the cone from the neck portion to the free outer end of the body, said body having two sets of inwardly turned flower-engaging teeth at its free outer end on opposite sides of said open sector whereby it can be manually pinched together about a portion of a flower into a substantially closed conical configuration so as to fix the flower on the cord.

References Cited by the Examiner
UNITED STATES PATENTS

| | | | |
|---|---|---|---|
| 2,249,567 | 7/41 | Reichelt | 24—5 X |
| 2,334,937 | 11/43 | La Fair. | |
| 2,641,086 | 6/53 | Shinoda | 161—27 XR |
| 2,984,036 | 5/61 | Adler | 161—21 XR |

EARL M. BERGERT, *Primary Examiner.*

JACOB H. STEINBERG, *Examiner.*